(12) United States Patent
Smith

(10) Patent No.: US 10,090,659 B2
(45) Date of Patent: Oct. 2, 2018

(54) RAINTIGHT FITTING FOR JACKETED METAL CLAD CABLES

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

(*) Notice: Subject to any disclaimer, the term of this patent is extended or adjusted under 35 U.S.C. 154(b) by 0 days.

(21) Appl. No.: 15/434,780

(22) Filed: Feb. 16, 2017

(65) Prior Publication Data

US 2018/0233892 A1    Aug. 16, 2018

(51) Int. Cl.
| | |
|---|---|
| *H02G 15/013* | (2006.01) |
| *H02G 3/06* | (2006.01) |
| *F16L 21/03* | (2006.01) |
| *F16L 41/02* | (2006.01) |

(52) U.S. Cl.
CPC ............ *H02G 15/013* (2013.01); *F16L 21/03* (2013.01); *F16L 41/023* (2013.01); *H02G 3/06* (2013.01); *H02G 3/0625* (2013.01)

(58) Field of Classification Search
CPC ...... H02G 15/013; H02G 3/06; H02G 3/0625; F16L 21/03; F16L 41/023
USPC .......................................................... 174/91
See application file for complete search history.

(56) References Cited

U.S. PATENT DOCUMENTS

| | | |
|---|---|---|
| 2,152,504 A | 3/1939 | Scott et al. |
| 2,552,414 A | 5/1951 | Eriksen et al. |
| 3,398,391 A | 8/1968 | Brishka |
| 3,533,051 A | 10/1970 | Ziegler, Jr. |
| 3,655,907 A | 4/1972 | Philibert et al. |
| 3,687,447 A | 8/1972 | Mundus |
| 4,259,542 A * | 3/1981 | Tehan .................... H02G 3/185 174/483 |

(Continued)

FOREIGN PATENT DOCUMENTS

| | | | |
|---|---|---|---|
| CN | 201413728 Y | * | 2/2010 |
| CN | 201413728 YH | * | 2/2010 |

*Primary Examiner* — Timothy Thompson
*Assistant Examiner* — Charles Pizzuto
(74) *Attorney, Agent, or Firm* — McCarter & English, LLP

(57) ABSTRACT

A raintight fitting has a fitting body including a plurality of first cable passageways configured to receive electrical cables. The first cable passageways converge into a second cable passageway, and the second cable passageway is configured to receive the conductors from plural cables received in the first cable passageways. A plurality of cable locks are each located at respective first cable passageways, are engageable with the cables received in the first cable passageways, and are configured to (i) secure the cables within the first cable passageways, and (ii) provide an electrically conductive path between the metallic covering of each cable and the fitting body. A raintight seal extends about the periphery of each first cable passageway, and is configured to form a raintight seal between (i) the fitting body and the electrical cables received within the first cable passageways and (ii) between the first cable passageways and ambient atmosphere. A raintight connector is connectable to a conduit for receiving conductors in the second cable passageway, and is configured to form a raintight seal between (i) the conduit and the fitting body and (ii) the second cable passageway and ambient atmosphere.

56 Claims, 13 Drawing Sheets

(56) References Cited

U.S. PATENT DOCUMENTS

| | | |
|---|---|---|
| 4,373,112 A | 2/1983 | Mizuno |
| 5,510,576 A | 4/1996 | Tenace et al. |
| 5,700,012 A * | 12/1997 | Froehlich .................. F16L 7/02 |
| | | 174/93 |
| 6,083,040 A | 7/2000 | Mosquera |
| 6,508,666 B1 | 1/2003 | Francis |
| 6,581,579 B1 | 6/2003 | Knight |
| 6,666,732 B1 | 12/2003 | Endacott |
| 6,679,726 B1 | 1/2004 | Tunn |
| 6,737,584 B2 * | 5/2004 | Kiely .................. H02G 3/0691 |
| | | 16/2.2 |
| 7,175,481 B1 | 2/2007 | Cotton |
| 7,390,027 B2 | 6/2008 | Kiely |
| 7,402,752 B1 * | 7/2008 | Kiely .................. H02G 3/0691 |
| | | 174/84 R |
| D581,877 S | 12/2008 | Kiely |
| 7,500,459 B2 | 3/2009 | Koji |
| 7,582,831 B2 | 9/2009 | Kiely et al. |
| 7,604,261 B2 | 10/2009 | Kiely |
| D604,242 S | 11/2009 | Kiely |
| 7,976,070 B2 | 7/2011 | Kiely |
| 8,050,528 B2 * | 11/2011 | Shimirak ............. H02G 15/013 |
| | | 174/77 R |
| D699,195 S | 2/2014 | Smith |
| 8,648,258 B2 | 2/2014 | Drouard et al. |
| 8,662,910 B2 | 3/2014 | Ichio et al. |
| 8,747,154 B2 | 6/2014 | Uchiyama |
| 9,553,440 B2 * | 1/2017 | Hanby .................. H01R 13/52 |
| 2001/0016457 A1 | 8/2001 | Taguchi et al. |
| 2014/0308834 A1 * | 10/2014 | Millevik .................. F16L 5/08 |
| | | 439/271 |
| 2015/0136472 A1 | 5/2015 | Hanby et al. |
| 2016/0099557 A1 | 4/2016 | Volkl et al. |
| 2016/0141853 A1 * | 5/2016 | Findley ................ H02G 15/007 |
| | | 174/653 |
| 2016/0204587 A1 * | 7/2016 | DeCesare ............. F16J 15/028 |
| | | 285/343 |

* cited by examiner

RAINTIGHT FITTING FOR JACKETED METAL CLAD CABLES

FIELD OF THE INVENTION

The present invention relates to fittings for electrical cables and conduits, and more particularly, to raintight fittings for connecting therethrough a plurality of jacketed metal clad or like cables, and forming a raintight seal between the interior of the fitting and the ambient atmosphere.

BACKGROUND INFORMATION

Metal clad cable ("MC") typically has two or more insulated conductors enclosed in an armor of interlocking metal tape, or a smooth corrugated metal sheath typically made of aluminum or galvanized steel. Typically, a polyester (Mylar®), or polypropylene insulating tape is wrapped around the insulated conductor bundle, and the metal sheath is wrapped around the insulating tape. MC cable is manufactured with a green insulated grounding conductor, and this conductor, in combination with the metallic armor, comprises the equipment grounding path when used with approved fittings. TECK cable or Jacketed Metal Clad ("JMC") cable are MC cable variants that comprise a flexible aluminum or steel armor and overall flame-retardant PVC jacket. TECK/JMC cables are used in industry for wet or dry locations, cable tray runs, or are attached to building structure, above grade or buried in earth. The jacket typically is made of extruded PVC and is raintight and oil resistant.

Transition fittings are used to transition from cable/conduit to different cable/conduit. Some transition fittings are used to transition from one or more cables, such as TECK/JMC cables, to rigid conduit, such as electrical metallic tubing ("EMT"). A duplex transition fitting typically transitions from two electrical cables to a single rigid conduit. Although TECK/JMC cables are raintight, certain transition fittings for such cables, such as duplex transition fittings, are not raintight. As a result, such fittings do not seal exposed conductors within the fitting from rain or other liquids in the ambient atmosphere.

It is an object of the present invention, and/or of the disclosed embodiments thereof, to overcome one or more of the above-described drawbacks and/or disadvantages of the prior art.

SUMMARY OF THE INVENTION

In accordance with a first aspect, the present invention is directed to a raintight fitting for plural electrical cables. Each electrical cable includes a flexible metallic covering, one or more insulated conductors located within the flexible metallic covering, and a raintight covering overlying the flexible metallic covering. The fitting comprises a fitting body defining a first end and a second end. The first end includes a plurality of first cable passageways, and each first cable passageway is configured to receive a respective electrical cable. The second end includes a second cable passageway. The plurality of first cable passageways converge into the second cable passageway, and the second cable passageway is configured to receive the conductors from plural cables received in the first cable passageways. The fitting further includes a plurality of cable locks. Each cable lock is located at a respective first cable passageway, is engageable with a cable received within the respective first cable passageway, and is configured to (i) secure the cable within the respective first cable passageway, and (ii) provide an electrically conductive path between the metallic covering of a cable received within the respective first cable passageway and the fitting body. A raintight seal is located at the first end of the fitting body, extends about the periphery of each first cable passageway, and is configured to form a raintight seal between (i) the fitting body and the electrical cables received within the first cable passageways and (ii) between the first cable passageways and ambient atmosphere. A raintight connector is located at the second end of the fitting body. The raintight connector is connectable to a conduit for receiving conductors in the second cable passageway, and is configured to form a raintight seal between (i) the conduit and second end of the fitting body and (ii) the second cable passageway and ambient atmosphere.

In some embodiments of the present invention, the raintight seal is elastic and defines a plurality of cable apertures. The seal is mountable to the fitting body with each aperture located at a respective first cable passageway. The seal is deformable by compression from (i) a first shape wherein each aperture defines a first width or diameter that allows a respective cable to pass through the aperture and into the respective first cable passageway, to (ii) a second shape wherein each aperture defines a second width or diameter that is less than the first width or diameter, and the seal is annularly engageable with the raintight covering of a cable received in the respective first cable passageway to form a raintight annular seal between the respective cable and seal. Some embodiments of the present invention further comprise a cover connectable to the fitting body. The seal is mountable between the cover and fitting body and the cover is movable between first and second positions. In the first position the seal is in the first shape, and in the second position the seal is deformed by the cover into the second shape.

In some embodiments of the present invention, the seal includes a peripheral portion extending along a periphery of the plurality of cable apertures, and an intermediary portion extending between adjacent cable apertures. The peripheral portion defines a side surface including one or more angled surface portions located on a respective side of the side surface. In some such embodiments, the side surface includes a first angled surface portion located on one side of the side surface, and a second angled surface portion located on an opposite side of the side surface. In some such embodiments, each cable aperture defines an axis extending therethrough, the first angled surface portion is oriented at a first acute angle with respect to a cable aperture axis, and the second angled surface portion is oriented at a second acute angle with respect to a cable aperture axis. In some such embodiments, the side surface further includes a substantially flat surface portion extending between the first and second angled surface portions.

In some embodiments of the present invention, the seal defines a plurality of adjacent, aligned cable apertures. In some embodiments, the seal includes a single sealing member defining the peripheral portion, the intermediary portion and the plurality of cable apertures. In some embodiments, the seal includes a first sealing member defining one or more first cable apertures, and a second sealing member defining one or more second cable apertures. In these embodiments, the intermediary portion is defined by an interface between the first and second sealing members. In some such embodiments, the interface is defined by opposing, substantially flat side surface portions of the first and second sealing members.

In some embodiments of the present invention, the fitting body defines a first angled sealing surface that is engageable with an angled surface of the seal to form a raintight seal therebetween, and that directs the seal to deform inwardly toward the axis of each respective cable aperture when compressed against the first angled sealing surface.

In some embodiments of the present invention, the cover defines a second angled sealing surface that is engageable with an angled surface of the seal to form a raintight seal therebetween, and that directs the seal to deform inwardly toward the axis of each respective cable aperture when compressed against the second angled sealing surface. In some embodiments, the cover defines on an interior surface thereof a protruding portion that engages a portion of the seal located between adjacent cable apertures, and that deforms the engaged portion of the seal inwardly toward an axis of each respective cable aperture. In some such embodiments, the protruding portion is defined by an elongated rib formed on the interior surface of the cover.

In some embodiments, the cover includes a plurality of cable apertures formed therethrough, and an intermediary portion extending between adjacent cable apertures. Each cable aperture of the cover is aligned with a respective cable aperture of the seal to allow a respective cable to pass through the cover aperture and seal aperture. In some embodiments, the cover defines an elongated axis and an axially-elongated shape. The cover apertures extend along, and are approximately symmetrical about the elongated cover axis. The seal also defines an elongated axis and an axially-elongated shape, and the seal apertures extend along and are approximately symmetrical about the elongated seal axis.

In some embodiments of the present invention, each cable lock defines an axis, and includes at least one locking tab that depends inwardly toward the axis. Each locking tab is engageable with the metallic covering of a cable received within the respective first cable passageway, and defines an electrically conductive path between the metallic covering of a cable received within the respective first cable passageway and the fitting body. In some such embodiments, the fitting body includes an interior surface defining a hollow interior, and each cable lock is received within the hollow interior and is frictionally engaged with the interior surface of the fitting body. Some embodiments further comprise a first cable lock, a second cable lock, and a cable lock support located between the first and second cable locks. In some such embodiments, the cable lock support frictionally engages the first and second cable locks. In some embodiments, each cable lock includes a body defining a curved body portion and a substantially flat body portion. The curved body portion frictionally engages the interior surface of the fitting body, and the substantially flat body portion frictionally engages the cable lock support. In some embodiments, the cable lock support defines a protruding portion that engages a portion of the seal located between adjacent cable apertures, and deforms the engaged portion of the seal inwardly toward an axis of each respective cable aperture.

In accordance with another aspect, the present invention is directed to a raintight fitting for plural electrical cables. Each cable includes a flexible metallic covering, one or more insulated conductors located within the flexible metallic covering, and a raintight covering overlying the flexible metallic covering. The fitting comprises first means for providing on a first side thereof a plurality of first cable passageways, for receiving an electrical cable in each first cable passageway, for converging the plurality of first cable passageways into a second cable passageway located at a second side thereof, and for receiving the conductors from the plural cables in the first cable passageways into and through the second cable passageway. The fitting further comprises second means for securing each cable within the respective first cable passageway, and for providing an electrically conductive path between the metallic covering of each cable received within a respective first cable passageway and the first means. The fitting includes third means for covering the first means at the first side thereof, and for receiving therethrough the cables passing through the first cable passageways in the first means. Fourth means is located at the first end of the first means, and extends about the periphery of each first cable passageway for forming a raintight seal between (i) the first means and the electrical cables received within the first cable passageways and (ii) the first cable passageways and ambient atmosphere. Fifth means is located at the second end of the first means for connecting to a conduit for receiving conductors in the second cable passageway, and for forming a raintight seal between (i) the conduit and second end of the first means and (ii) the second cable passageway and ambient atmosphere.

In some embodiments of the present invention, the first means is a fitting body, the second means is a plurality of cable locks, the third means is a cover, the fourth means is an elastic seal, and the fifth means is a raintight connector.

One advantage of the present invention, and/or of embodiments thereof, is that the transition fitting, such as a fitting for transitioning from plural JMC cables to a single rigid conduit or to a junction box or other enclosure, defines raintight seals at both the first and second ends thereof. As a result, the interior of the fitting, and thus the cable conductors extending through the fitting, are raintight sealed with respect to ambient atmosphere.

Other advantages of the present invention, and/or of the disclosed embodiments thereof, will become more readily apparent in view of the following detailed description of embodiments and accompanying drawings.

DETAILED DESCRIPTION OF EMBODIMENTS

Figure 1:
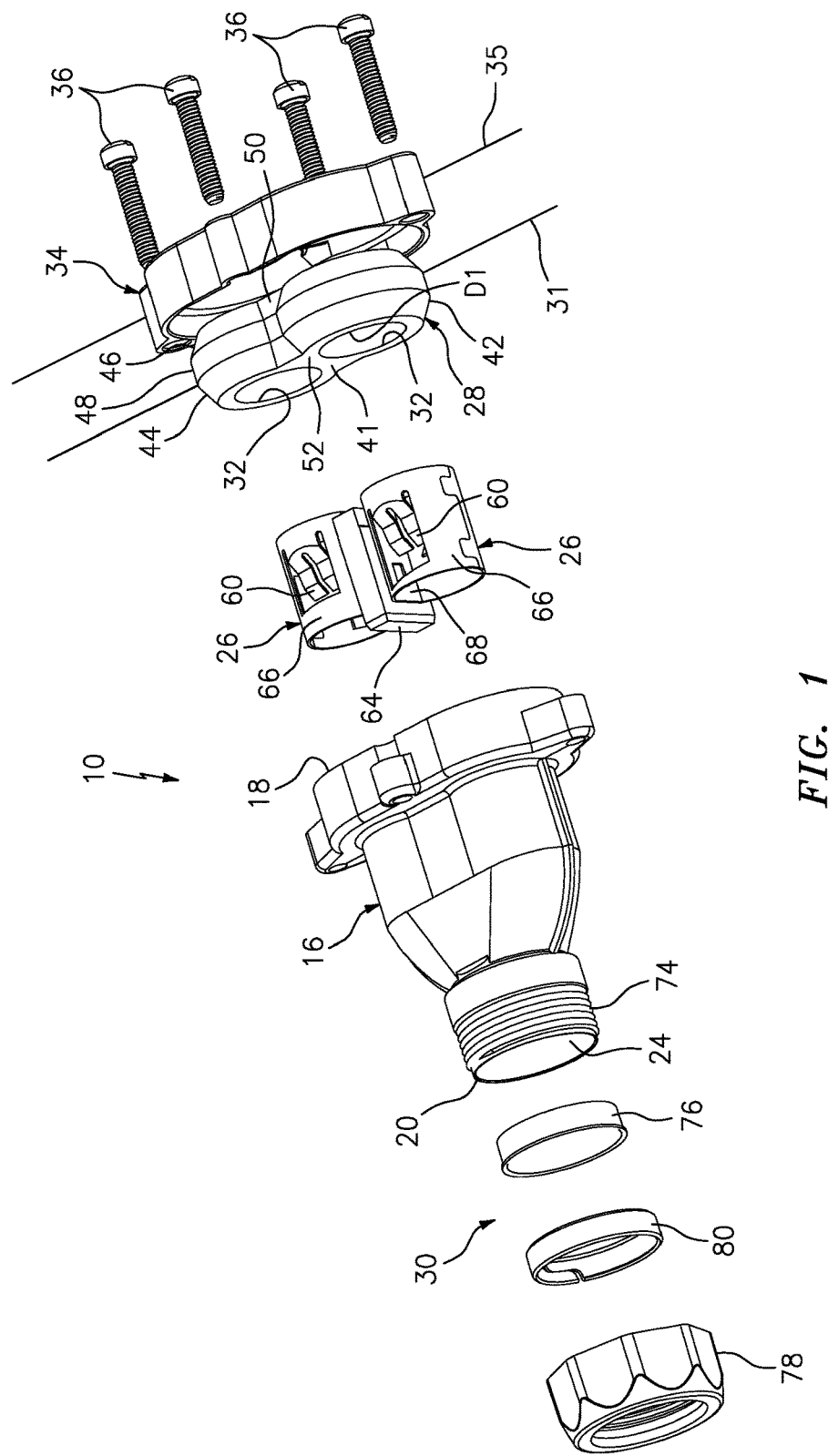
FIG. 1 is an exploded, perspective view of a duplex fitting that transitions from two electrical cables at a first end to a single rigid conduit at a second end, and that includes raintight seals at both the first and second ends of the fitting.

In FIGS. 1-7, a first embodiment of a fitting is indicated generally by the reference numeral 10. The fitting 10 is a duplex transition fitting that transitions from two JMC electrical cables 12, 12 to a single rigid conduit 14, such as EMT. However, as may be recognized by those of ordinary skill in the pertinent art based on the teachings herein, the fitting need not be a duplex transition fitting, but rather may take the form of any of numerous other types of fittings that are currently known, or that later become known. Each JMC cable 12, 12 includes a flexible metallic covering, one or more insulated conductors located within the flexible metallic covering, and a raintight or liquid-tight covering overlying the flexible metallic covering. The fitting 10 comprises a fitting body 16 defining a first end 18 and a second end 20. The first end 18 includes a plurality of first cable passageways 22, 22, and each first cable passageway is configured to receive a respective electrical cable 12, 12. The second end 20 includes a second cable passageway 24. As can be seen, the plurality of first cable passageways 22, 22 converge into the second cable passageway 24, and the second cable passageway 24 is configured to receive the conductors from the cables received in the first cable passageways 22, 22. The fitting 10 further includes a plurality of cable locks 26, 26. Each cable lock 26, 26 is located at a respective first cable passageway 22, 22, is engageable with a cable 12, 12 received within the respective first cable passageway, and is configured to (i) secure the cable within the respective first cable passageway, and (ii) provide an electrically conductive path between the metallic covering of a cable received within the respective first cable passageway and the fitting body 16. A seal 28 is located at the first end 18 of the fitting body 16, extends about the periphery of each first cable passageway 22, 22, and is configured to form a raintight seal between (i) the fitting body 16 and the electrical cables 12, 12 received within the first cable passageways 22, 22, and (ii) between the first cable passageways and ambient atmosphere. A raintight connector 30 is located at the second end 20 of the fitting body 16. The raintight connector 30 is connectable to the conduit 14 for receiving conductors in the second cable passageway 24, and is configured to form a raintight seal between (i) the conduit 14 and second end 20 of the fitting body, and (ii) the second cable passageway 24 and ambient atmosphere.

In the illustrated embodiment, the seal 28 is in the form of an elastic grommet defining a plurality of cable apertures 32, 32. The seal 28 is mountable to the fitting body 16 with each cable aperture 32, 32 located at and aligned with a respective first cable passageway 22, 22. The seal 28 is deformable by compression from (i) a first shape wherein each cable aperture 32, 32 defines a first width or diameter D1 (FIG. 1) that allows a respective cable 12, 12 to pass through the aperture and into the respective first cable passageway 22, 22, to (ii) a second shape wherein each cable aperture 32, 32 defines a second width or diameter D2 (FIG. 3) that is less than the first width or diameter, and the seal 28 is annularly engageable with the raintight covering 29 of a cable 12, 12 received in the respective first cable passageway 22, 22 to form a raintight annular seal between the respective cable and seal. The seal 28 defines an elongated axis 31 and an axially-elongated shape, and the seal apertures 32, 32 extend along and are approximately symmetrical about the elongated seal axis.

Figure 3:
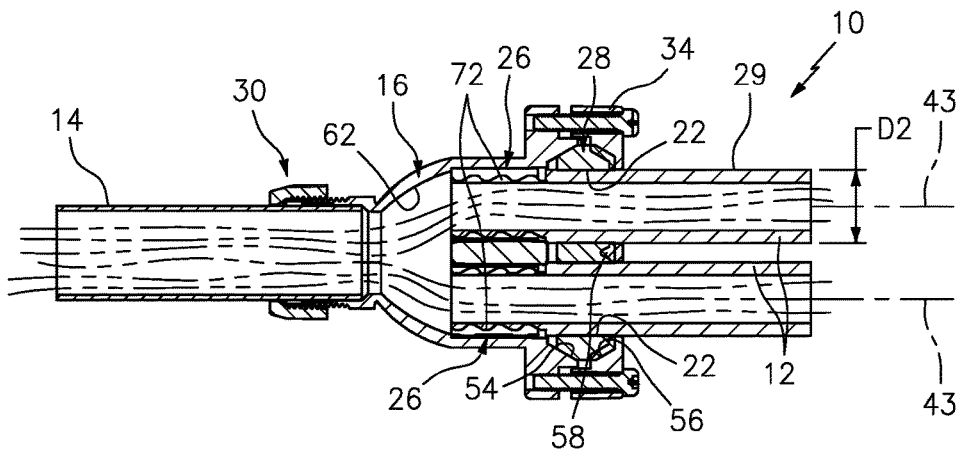
FIG. 3 is another cross-sectional view of the assembled fitting of FIG. 2 taken orthogonal to the view of FIG. 2.

The fitting 10 further comprises a cover 34 connectable to the fitting body 16. The seal 28 is mountable between the cover 34 and fitting body 16, and the cover is movable between first and second positions. In the first position the seal 28 is in the first shape (FIG. 1), and in the second position the seal 28 is compressed and thereby deformed by the cover 34 into the second shape (FIG. 3). A plurality of fasteners 36, 36 are connected between the cover 34 and fitting body 16. Each fastener 36, 36 secures the cover 34 to the fitting body 16 in the second position. In the illustrated embodiment, each fastener 36, 36 threadedly engages the fitting body 16, and thus is movable to thereby move the cover between the first and second positions. As may be recognized by those of ordinary skill in the pertinent art based on the teachings herein, the fasteners 36, 36 may take the form of any of numerous different types of fasteners that are currently known, or that later become known.

Figure 4:
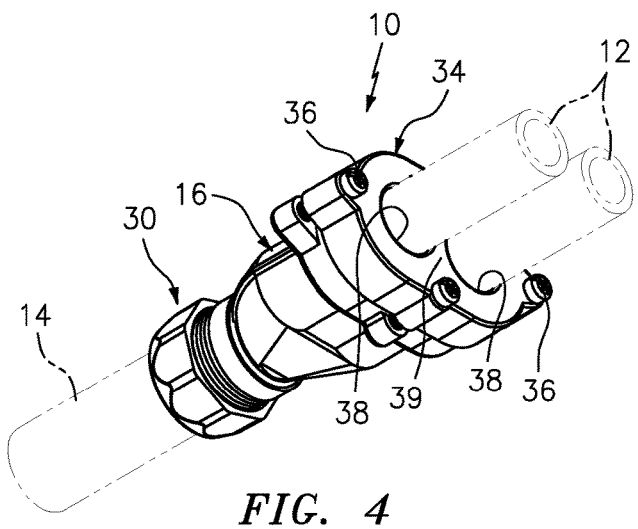
FIG. 4 is a perspective view of the assembled fitting of FIG. 2.
Figure 5:
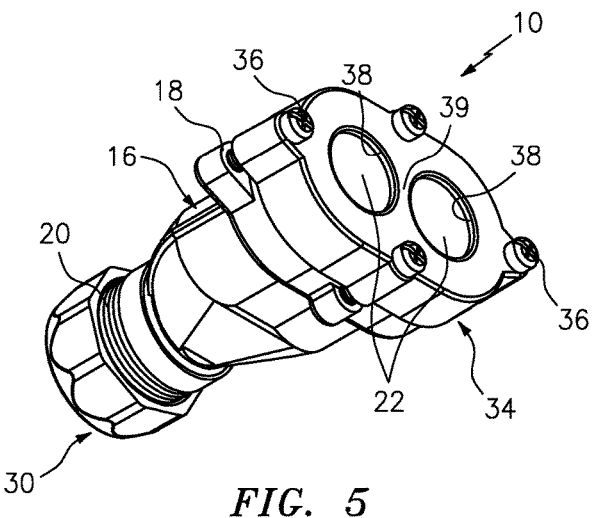
FIG. 5 is a perspective view of the fitting of FIG. 1 assembled without any cables or rigid conduit.

As shown in FIGS. 4 and 5, the cover 34 includes a plurality of cable apertures 38, 38 formed therethrough, and an intermediary portion 39 extending between adjacent cable apertures. Each cable aperture 38, 38 of the cover 34 is aligned with a respective cable aperture 32, 32 of the seal 28 and first cable passageway 22, 22 of the fitting body 12, to thereby allow each cable 12, 12 to pass through respective aligned cover, seal apertures and first cable passageway. As shown in FIG. 1, the cover 34 defines an elongated axis 35 and an axially-elongated shape. The cover apertures 38, 38 extend along, and are approximately symmetrical about the elongated cover axis 35.

The seal 28 includes a peripheral portion 40 extending along a periphery of the plurality of cable apertures 32, 32, and an intermediary portion 41 extending between adjacent cable apertures. The peripheral portion 40 defines a side surface 42. The side surface 42 includes a first angled surface portion 44 located on one side of the surface 42, and a second angled surface portion 46 located on an opposite side of the surface 42. Each cable aperture 32, 32 defines an axis 43 extending therethrough (FIG. 3), the first angled surface portion 44 is oriented at a first acute angle with respect to the cable aperture axis, and the second angled surface portion 46 is oriented at a second acute angle with respect to the cable aperture axis. The first and second angled surface portions 44 and 46, respectively, are angled in approximately opposite directions relative to each other. The first and second acute angles are within the range of about 15° to about 45°, are preferably within the range of about 25° to about 35°, and are more preferably about 30°. However, as may be recognized by those of ordinary skill in the pertinent art based on the teachings herein, these angles are exemplary and may be changed as required. The side surface 42 further includes a substantially flat surface portion 48 extending between the first and second angled surface portions 44 and 46, respectively. In the illustrated embodiment, the seal 28 is formed by a single sealing member defining the peripheral portion 40, the intermediary portion 41 and the plurality of cable apertures 32, 32. However, as described further below, the seal may be formed by a plurality of sealing members that cooperate to define the seal.

As can be seen, each angled surface portion 44, 46 of the seal 28 extends about a portion of the periphery of each cable aperture 32, 32, and extends along the intermediary portion 41 of the seal extending between adjacent cable apertures 32, 32. In the illustrated embodiment, the angled surface portions 44, 46 extend along a portion of the periphery of each cable aperture 32, 32 that is within the range of greater than about ½ of each periphery to less than about ⅘ of each periphery. The seal 28 further defines an upper surface 50 and a lower surface 52, and the side surface 42 extends between the upper and lower surfaces. In the illustrated embodiment, the upper and lower surfaces 50, 52 are substantially flat and the seal is made of rubber. However, as may be recognized by those of ordinary skill in the pertinent art based on the teachings herein, the upper, lower and other surfaces of the seal may define any of numerous different shapes and/or configurations, and the seal made be made of any of numerous different materials, that are currently known, or that later become known.

Figure 6:
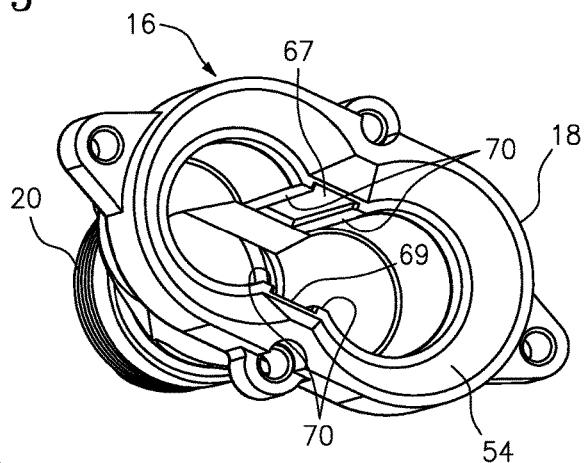
FIG. 6 is a perspective view of the body of the fitting of FIG. 1.

As shown in FIG. 6, the fitting body 16 defines at the first end thereof a first angled sealing surface 54 extending about the periphery of the first end 18. In the illustrated embodiment, the angle of the first angled sealing surface 53 is approximately equal to the angle of the first angled sealing surface 44 of the seal 28. The first angled sealing surface 54 is engageable with the first angled surface 44 of the seal 28 to form a raintight seal therebetween, and directs the seal to deform inwardly toward the axis of each respective cable aperture 32, 32 when compressed against the first angled sealing surface.

Figure 7:
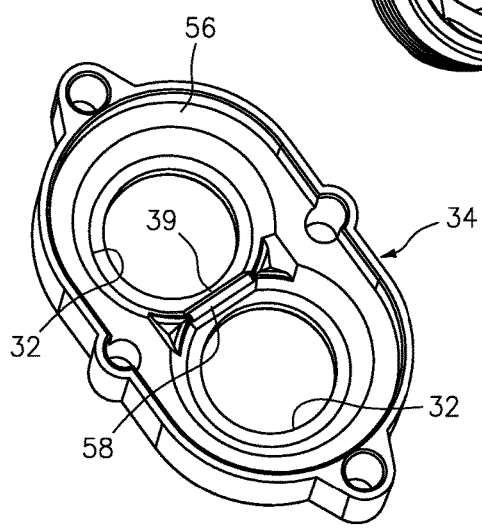
FIG. 7 is a perspective view of the cover of the fitting of FIG. 1.

As shown in FIG. 7, the cover 34 defines a second angled sealing surface 56 extending about the periphery of the inner side of the cover. In the illustrated embodiment, the angle of the second angled sealing surface 56 is approximately equal to the angle of the second angled sealing surface 46 of the seal 28. The second angled sealing surface 56 is engageable with the second angled surface 46 of the seal 28 to form a raintight seal therebetween, and directs the seal to deform inwardly toward the axis of each respective cable aperture 32, 32 when compressed against the second angled sealing surface. The cover 34 defines on an interior surface of its intermediary portion 39 a protruding portion 58 that engages the upper surface 50 of the intermediary portion 41 of the seal 28 located between the cable apertures 32, 32. When the cover 34 is pressed against the seal 28, the protruding portion 58 deforms the engaged intermediary portion 41 of the seal inwardly toward the axis of each respective cable aperture. In the illustrated embodiment, the protruding portion 58 is defined by an elongated rib formed on the interior surface of the cover, and the elongated rib defines an approximately triangular cross-sectional shape. However, as may be recognized by those of ordinary skill in the pertinent art based on the teachings herein, the protruding portion of the cover may take any of numerous different shapes and/or configurations, and may be located in any of numerous different positions, that are currently known, or that later become known.

Each cable lock 26, 26 defines an axis that is substantially coincident with the axis 43 of the respective cable aperture 32 and first cable passageway 22. Each cable lock 26, 26 includes at least one locking tab 60 that depends inwardly toward the axis 43 in the direction from the first end 18 toward the second end 20 of the fitting body 16. Each locking tab 60 is engageable with the metallic covering of a cable 12, 12 received within the respective first cable passageway 22, 22, and defines an electrically conductive path between the metallic covering of the engaged cable and the fitting body 16. The fitting body 16 includes an interior surface 62 defining a hollow interior, and each cable lock 26, 26 is received within the hollow interior and is frictionally engaged with the interior surface 62 of the fitting body. In the illustrated embodiment, the fitting 10 comprises first and second cable locks 26, 26, and a cable lock support or wedge block 64 located between the first and second cable locks. The cable lock support 64 frictionally engages the first and second cable locks 26, 26 to retain the cable locks within the fitting body, and further form the electrically conductive path between the cables and ground. Each cable lock 26, 26 includes a body defining a curved body portion 66 and a substantially flat body portion 68 extending between opposite ends of the curved body portion. Each curved body portion 66, 66 frictionally engages the interior surface 62 of the fitting body, and each substantially flat body portion 68 frictionally engages the cable lock support located between the first and second cable locks. As shown in FIG. 3, the first and second cable locks 26, 26 are press fit into the fitting body 16 with the curved surface portions 66 frictionally engaging the curved interior surface 62 of the fitting body, and the flat surface portions 68 frictionally engaging the opposing flat side surfaces of the cable lock support 64. Accordingly, the cable locks 26, 26 are fixedly retained within the interior of the fitting body 12, each locking tab 60 engages the outer metal jacket of a respective cable 12, 12 to thereby fixedly retain the cables within the cable locks and fitting body, and provide a low impedance, electrically conductive path between the outer metal jackets of the cables, the cable locks, the cable lock support, the fitting body and ground.

As shown in FIG. 6, the fitting body 16 defines a first elongated recess 67 formed on one side of the hollow interior, and a second elongated recess 69 formed on a substantially opposite side of the hollow interior. Each elongated recess 67, 69 is defined by a pair of spaced ribs 70, 70 defining the respective recess therebetween. Opposite sides of the cable lock support 64 are frictionally received and retained within the respective elongated recesses 67, 69. Each tab 60 flexes outwardly relative to the respective elongated axis 43 when the outer metal jacket of a respective cable 12 is pressed against the tab upon insertion of the cable into the cable lock. The distal or free end of each tab 60 is received within a spiral groove 72 (FIG. 3) defined by the outer metal jacket of the respective cable 12, and engages the side wall of the spiral groove to thereby prevent the cable from being pulled axially out of the cable lock and fitting body, i.e., in the direction from the second end 20 toward the first end 18 of the fitting body. However, each cable 12 may be rotated relative to the respective tab 60 such that the spiral groove 72 moves relative to the tab to, in turn, rotationally move the cable in the axial direction out of the cable lock and fitting body, i.e., in the direction from the second end 20 toward the first end 18 of the fitting body. Accordingly, each cable lock 26 prevents the cable 12 received in the respective first cable passageway 22 from being axially pulled from the respective first cable passageway, but allows the cable to be rotatably removed from the respective first cable passageway. In the illustrated embodiment, the fitting body, cable lock support and cover are made of a zinc alloy, and the locking rings are made of steel, to facilitate the provision of the electrically conductive path. However, as may be recognized by those of ordinary skill in the pertinent art based on the teachings herein, these components may be made of any of numerous different materials that are currently known, or that later become known.

Figure 2:
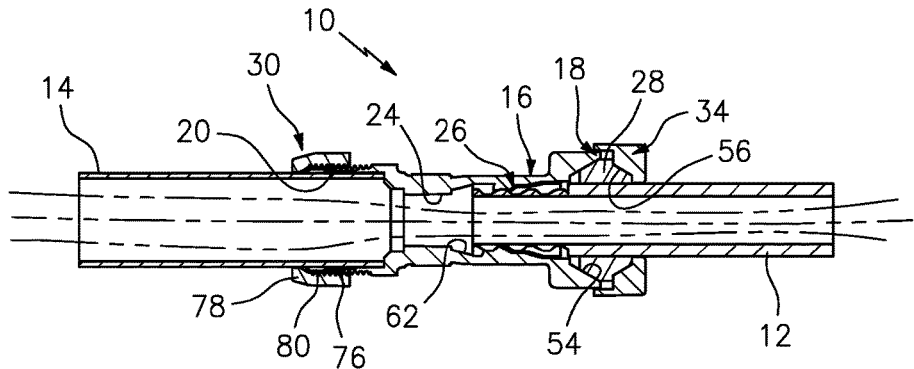
FIG. 2 is a cross-sectional view of the fitting of FIG. 1 assembled between two cables and a rigid conduit, and taken along the axis of one of the cables and along the axis of the rigid conduit.

As shown best in FIGS. 1-3, the raintight connector 30 comprises a male threaded boss 74 formed at the second end 20 of the fitting body 10, an annular sealing ring 76 that is receivable within the distal end of the threaded boss 74, a female threaded compression nut 78, and a gland ring 80 receivable within the compression nut between the compression nut and sealing ring. As shown in FIGS. 2 and 3, the EMT conduit 14 is receivable within the boss 74 with the annular sealing ring 80 sealingly engaged between the conduit and boss, and thus forming a raintight seal between (i) the conduit and fitting body and (ii) between the second cable passageway 24 and ambient atmosphere. As can be seen, the gland ring 80 defines a split-ring construction allowing constriction of the ring diameter when compressed by the compression nut 78. The conduit 14 is fixedly secured to the fitting body 16 by threadedly engaging the compression nut 78 to the threaded boss 74 which, in turn, compresses the gland ring 80 against the conduit to fixedly secure the conduit to the fitting body. In the illustrated embodiment, the rain-tight sealing ring 76 is formed of plastic, the compression nut 78 is formed of a zinc alloy, and the gland ring 80 is formed of steel. However, as may be recognized by those of ordinary skill in the pertinent art based on the teachings herein, the materials of construction, and the configurations of the sealing ring, compression nut, and gland ring may take the form of any of numerous different materials and/or configurations that are currently known, or that later become known.

Figure 8:
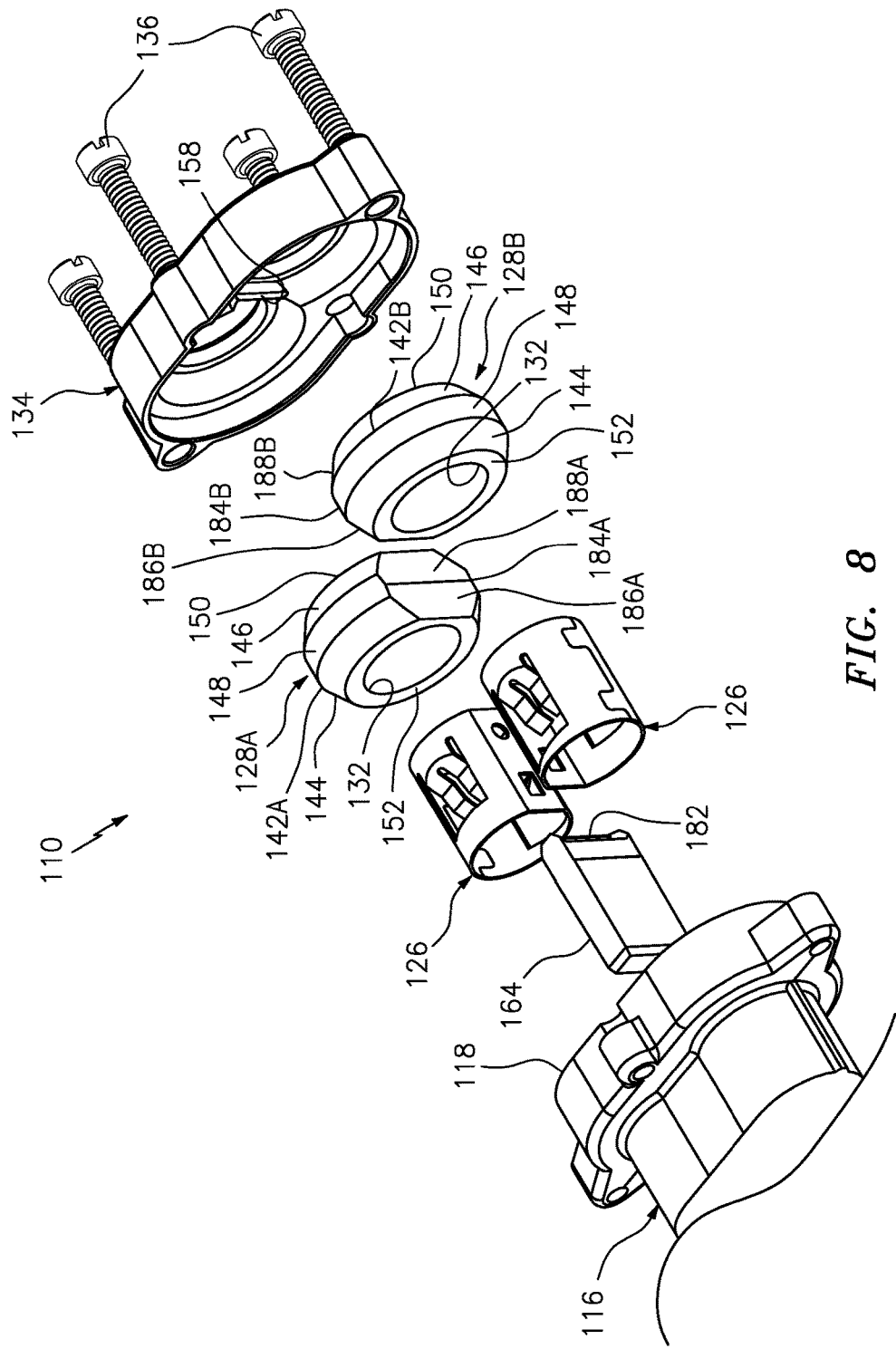
FIG. 8 is a partial, exploded view of another duplex fitting that transitions from two electrical cables at a first end to a single rigid conduit at a second end, where the raintight seal at the first end is formed by two seals or grommets.
Figure 9:
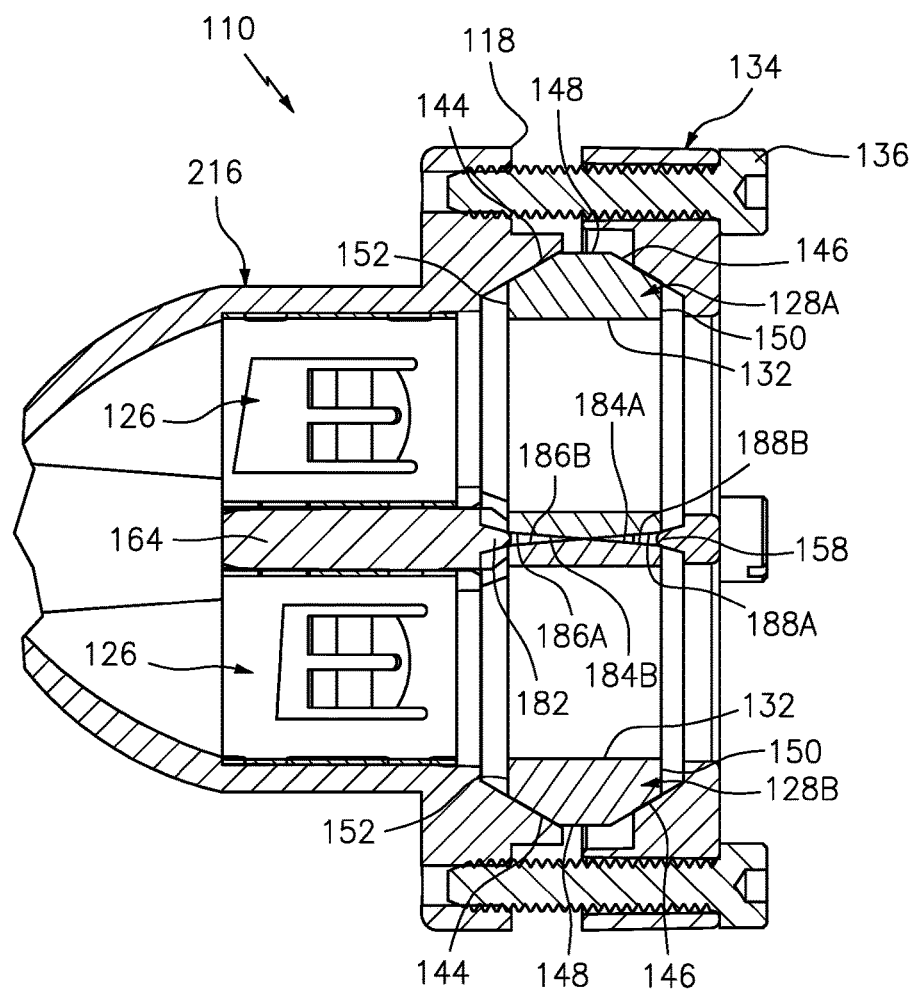
FIG. 9 is a partial, cross-sectional view of the fitting of FIG. 8 in assembled form without any cables or conduit.

In FIGS. 8 and 9, another embodiment of a fitting is indicated generally by the reference numeral 110. The fitting 110 is substantially the same as the fitting 10 described above in connection with FIGS. 1-7, and therefore like reference numerals preceded by the numeral "1" are used to identify the same or like elements. The primary difference of the fitting 110 in comparison to the fitting 10 is that the seal 128 is formed by a pair of seals or grommets 128A and 128B. The cable lock support 164 defines a raised area or rib 182 that is engageable with the grommets 128A, 128B at their interface to direct the grommet material inwardly and facilitate forming annular, raintight seals between the grommets and raintight or liquid-tight coverings of the cables received therethrough. The two grommets 128A, 128B define opposing substantially straight side surface portions 184A, 184B, and curvilinear side surface portions 142A, 142B extending throughout the remainder of the periphery of each grommet. Grommet 128A includes a side surface 184A defining a first angled surface portion 186A and a second angled surface portion 188A, and grommet 128B includes a side surface 184B defining a first angled surface portion 186B and a second angled surface portion 188B. Each angled surface portion 186, 188 is oriented at an acute angle relative to the axis 143 of the respective cable aperture 132; however, as can be seen, each such acute angle is less than the acute angle of the circular side surface portions 144, 146. As shown in FIG. 9, when the cover 134 is secured to the fitting body 116, the grommets 128A, 128B are compressed between the cover and fitting body. The raised area or rib 182 of the cable lock support 164 is, in turn, pressed between the opposing side surface portions 184A and 184B, engages the opposing first angled surface portions 186A, 186B, and deforms the grommet material inwardly to engage the respective cables and form an annular, raintight seal therebetween. The raised area or rib 158 of the cover 134 similarly is pressed between the opposing side surface portions 184A and 184B of the grommets, engages the opposing second angled surface portions 188A, 188B and, in turn, deforms the grommet material inwardly to engage the respective cables and further form an annular, raintight seal therebetween.

Figure 10:
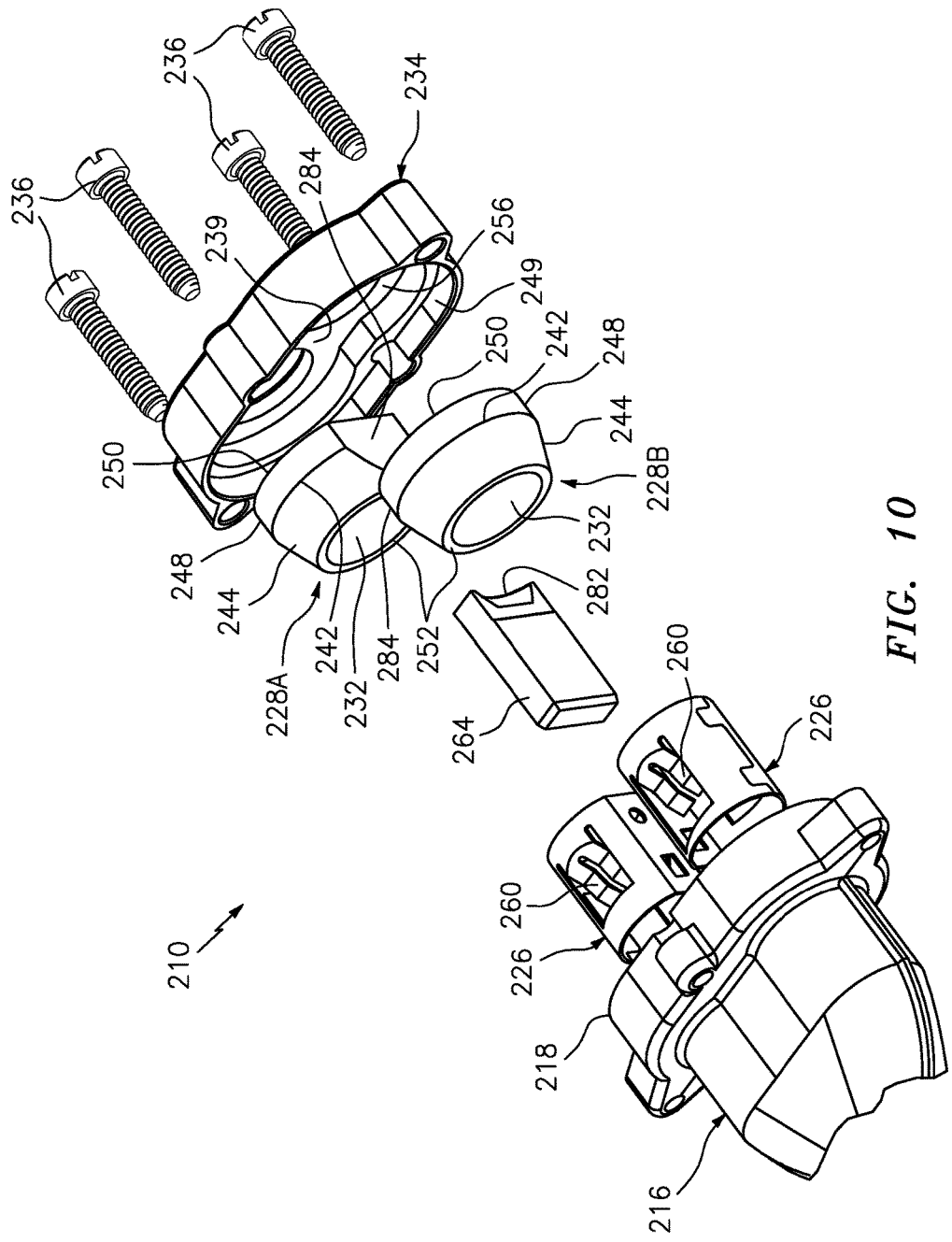
FIG. 10 is a partial, exploded view of another duplex fitting that transitions from two electrical cables at a first end to a single rigid conduit at a second end, where the raintight seal at the first end is formed by two seals or grommets defining a different configuration than the seals in the embodiments above.
Figure 11:
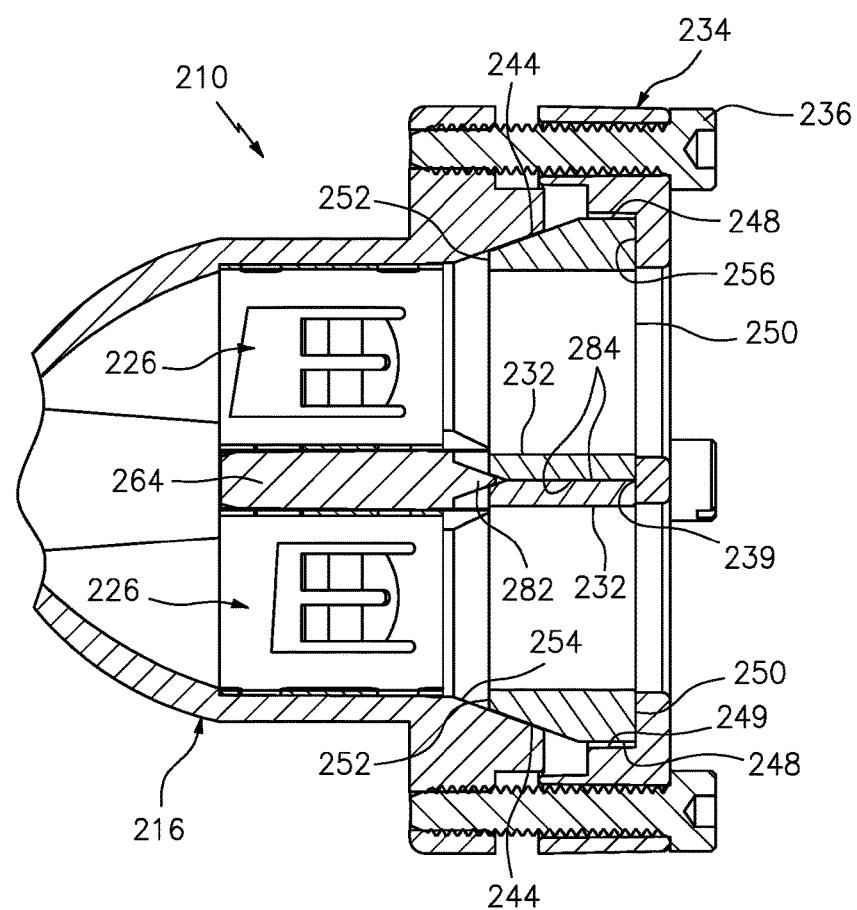
FIG. 11 is a partial, cross-sectional view of the fitting of FIG. 10 in assembled form without any cables or conduit.

In FIGS. 10 and 11, another embodiment of a fitting is indicated generally by the reference numeral 210. The fitting 210 is substantially the same as the fitting 110 described above in connection with FIGS. 1-7, and therefore like reference numerals preceded by the numeral "2" instead of the numeral "1" are used to identify the same or like elements. The primary difference of the fitting 210 in comparison to the fitting 110 is that the grommets 228A, 228B define curvilinear side surfaces 242, and contiguous substantially flat side surfaces 284. Each curvilinear side surface 242 defines an angled sealing surface 244 extending along one side of the curvilinear side surface, and a flat sealing surface 248 extending along the opposite side of the curvilinear side surface. Each grommet 228A, 228B further defines a substantially flat lower surface 250, and a substantially flat upper surface 252. In contrast to the preceding embodiment, each curvilinear side surface 242 defines only one angled sealing surface. Also in contrast to the preceding embodiment, the opposing flat side surfaces 284 are substantially flat, and do not define angled surface portions. As shown in FIG. 11, the substantially flat upper surface 250 of each grommet engages a corresponding flat recessed sealing surface 256 in the cover 234 extending about the periphery of the cable apertures 232 in the cover to thereby form raintight seals therebetween. The substantially flat side surface portions 248 of the grommets engage a peripheral sealing surface 249 of the cover to thereby form a peripheral, raintight seal therebetween. Similarly, the angled side surface portions 244 of the grommets engage the peripheral sealing surface 254 of the fitting body 216 to thereby form a peripheral, raintight seal therebetween. In the illustrated embodiment, the cover 234 defines a flat intermediary portion 239 that sealingly engages the flat upper surfaces 250 of the grommets to form a raintight seal therebetween. The cable lock support or wedge block 264 includes a raised area or rib 282 that is received and pressed between the opposing side surface portions 284, 284 of the grommets upon securing the cover 234 to the fitting body 216 to, in turn, deform the grommet material inwardly, engage the respective cables with the grommet material, and form annular, raintight seals therebetween.

Figure 12:
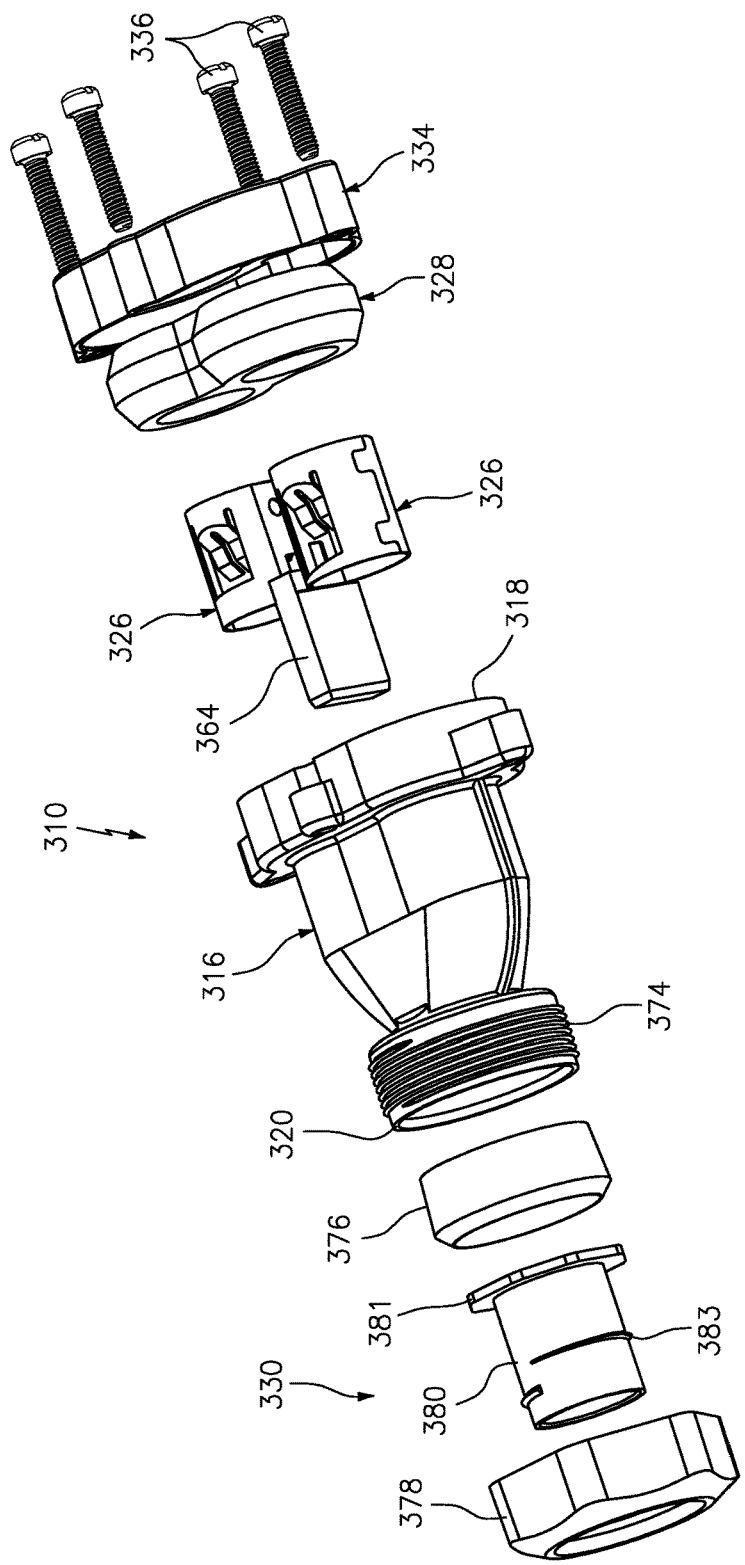
FIG. 12 is an exploded, perspective view of a duplex fitting that transitions from two electrical cables at a first end to a single rigid conduit at a second end, and comprising a connector at the second end including a compression nut, a ferrule and a gland ring that form a raintight or liquid-tight connection to a rigid conduit.
Figure 13:
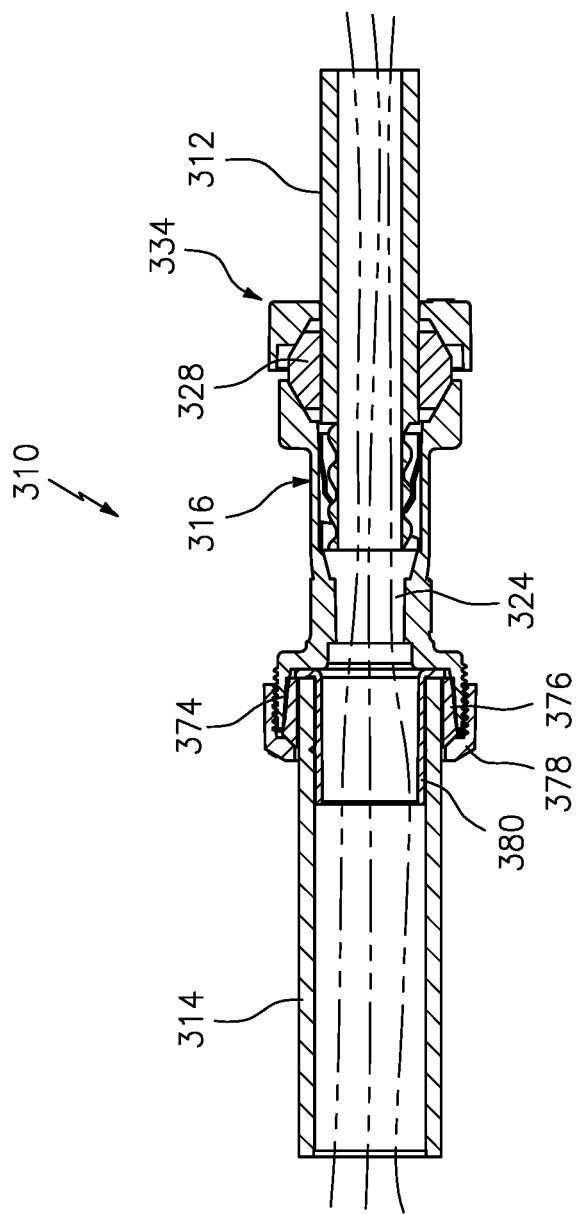
FIG. 13 is a cross-sectional view of the fitting of FIG. 12 assembled between two cables and a rigid conduit, and taken along the axis of one of the cables and along the axis of the rigid conduit.

In FIGS. 12 and 13, another embodiment of a fitting is indicated generally by the reference numeral 310. The fitting 310 is substantially the same as the fitting 10 described above in connection with FIGS. 1-7, and therefore like reference numerals preceded by the numeral "3" are used to identify the same or like elements. The primary difference of the fitting 310 in comparison to the fitting 10 is the construction of the raintight or liquid-tight connector 330. The connector 330 comprises a male threaded boss 374 formed at the second end 320 of the fitting body 10, an annular gland ring 376 that is receivable within the distal end of the threaded boss 374, a female threaded compression nut 378, and a ferrule 380 receivable within the conduit 314 between the conduit and male threaded boss 374. As shown in FIG. 13, the conduit 314 is receivable within the boss 374 with the ferrule 380 received within the end of the conduit. A flange 381 of the ferrule is seated between the end of the conduit 314 and the interior base surface of the boss 374. A spiral rib 383 of the ferrule engages the interior surface of the conduit to secure the ferrule to the conduit. The annular gland ring 376 is sealingly engaged between the exterior surface of the conduit and interior annular surface of the boss 374 and compression nut 378, thus forming a raintight or liquid-tight seal between (i) the conduit and fitting body and (ii) between the second cable passageway 324 and ambient atmosphere. In the illustrated embodiment, the fitting body/boss 374 is made of zinc alloy, the gland ring 376 is made of low density polyethylene, the ferrule 380 is made of zinc alloy, and the compression nut 378 is made of zinc alloy. However, as may be recognized by those of ordinary skill in the pertinent art based on the teachings herein, the materials of construction, and the configurations of the boss, gland ring, ferrule, and compression nut, may take the form of any of numerous different materials and/or configurations that are currently known, or that later become known.

Figure 14:
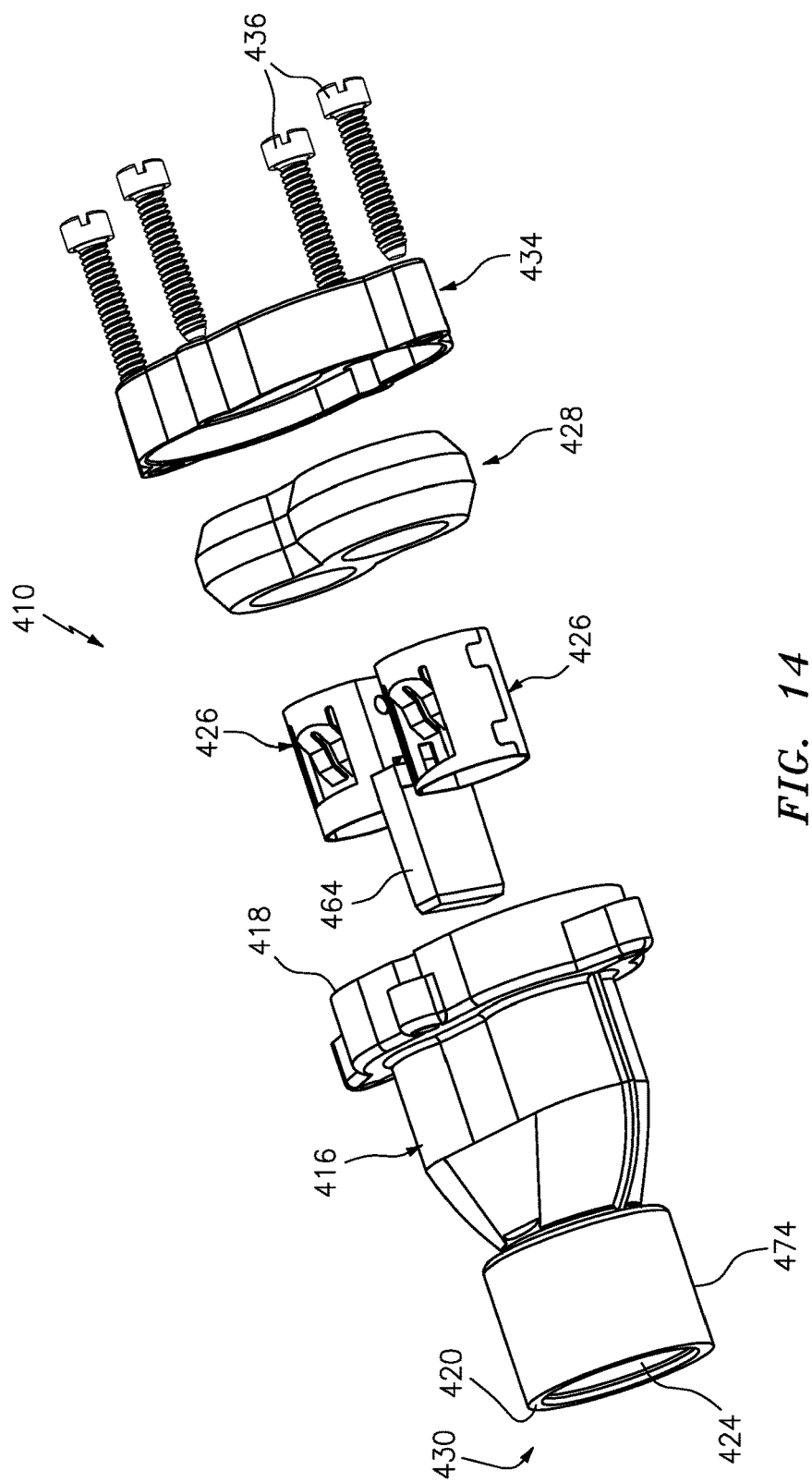
FIG. 14 is an exploded, perspective view of a duplex fitting that transitions from two electrical cables at a first end to a single rigid conduit at a second end, and comprising a connector at the second end including a pipe thread that forms a raintight or liquid-tight connection to a rigid conduit.
Figure 15:
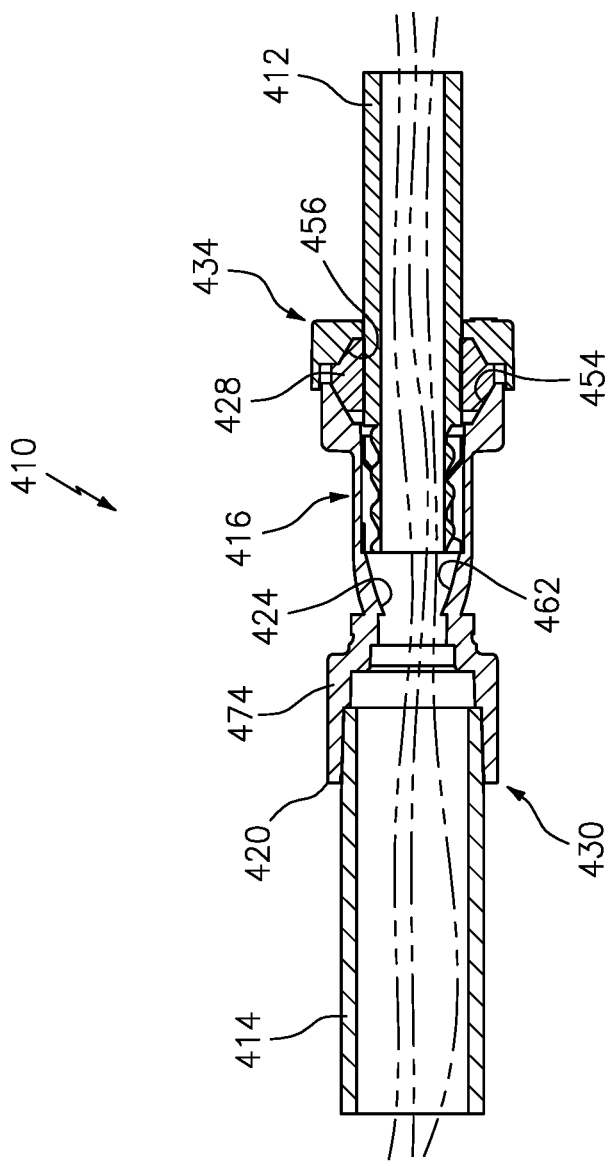
FIG. 15 is a cross-sectional view of the fitting of FIG. 14 assembled between two cables and a rigid conduit, and taken along the axis of one of the cables and along the axis of the rigid conduit.

In FIGS. 14 and 15, another embodiment of a fitting is indicated generally by the reference numeral 410. The fitting 410 is substantially the same as the fitting 10 described above in connection with FIGS. 1-7, and therefore like reference numerals preceded by the numeral "4" are used to identify the same or like elements. The primary difference of the fitting 410 in comparison to the fitting 10 is the construction of the connector 430. The boss 474 at the second end 420 of the fitting body 416 defines a female national pipe thread ("NPT"). The rigid conduit 414 defines a corresponding male NPT that threadedly engages the female NPT to fixedly secure the rigid conduit 414 to the fitting body boss 474 and form a raintight seal therebetween. The NPT are tapered in a manner known to those of ordinary skill in the pertinent art. The tapered thread construction allows the flanks of the threads to compress against each other when torqued to thereby form a raintight or liquid-tight seal between the threads, and thus between (i) the conduit and fitting body and (ii) between the second cable passageway and ambient atmosphere.

Figure 16:
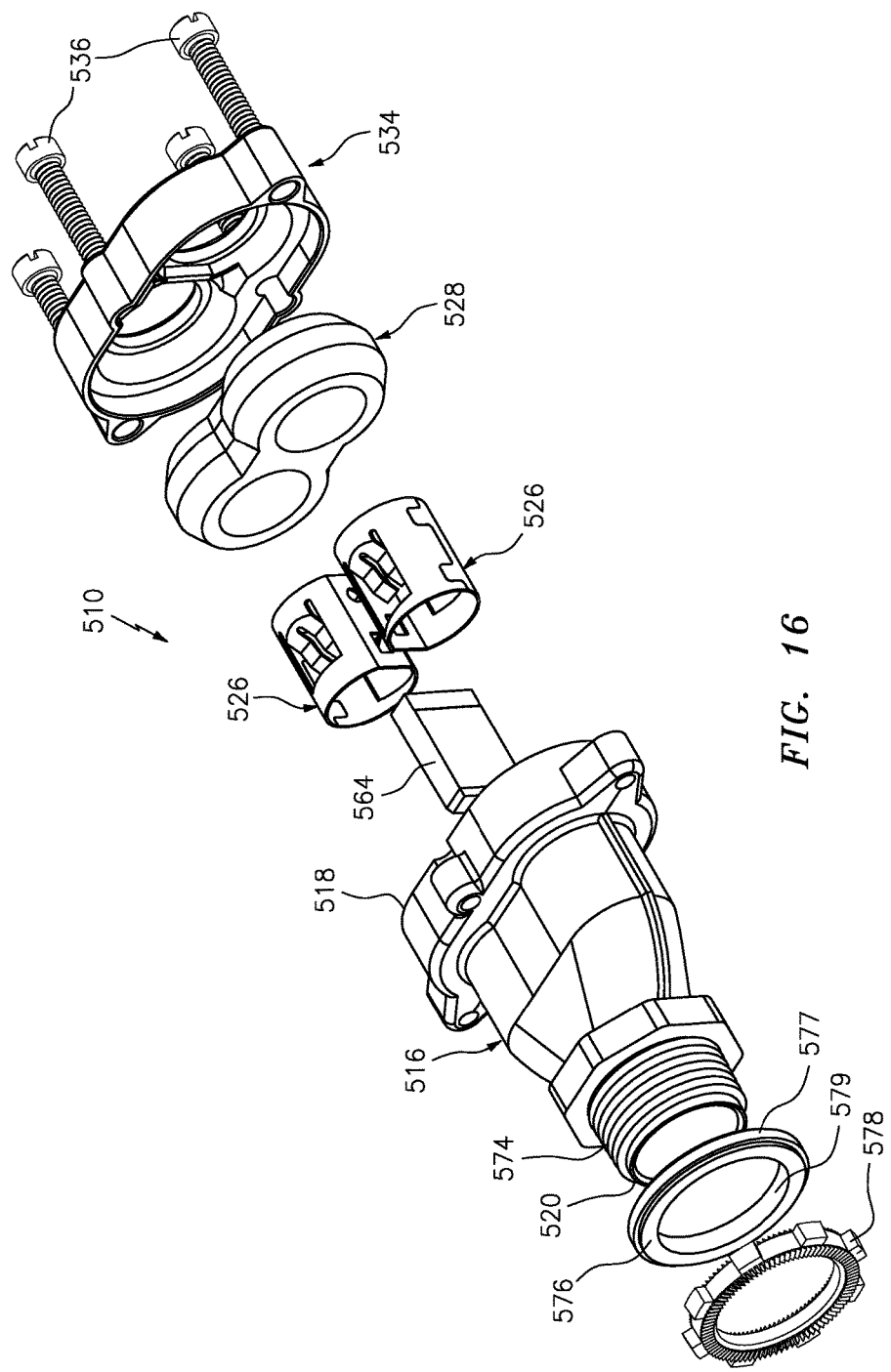
FIG. 16 is an exploded, perspective view of a duplex fitting that transitions from two electrical cables at a first end to a single rigid conduit at a second end, and comprising a connector at the second end that forms a liquid-tight or raintight connection to a box or enclosure, such as an electrical wall box.
Figure 17:
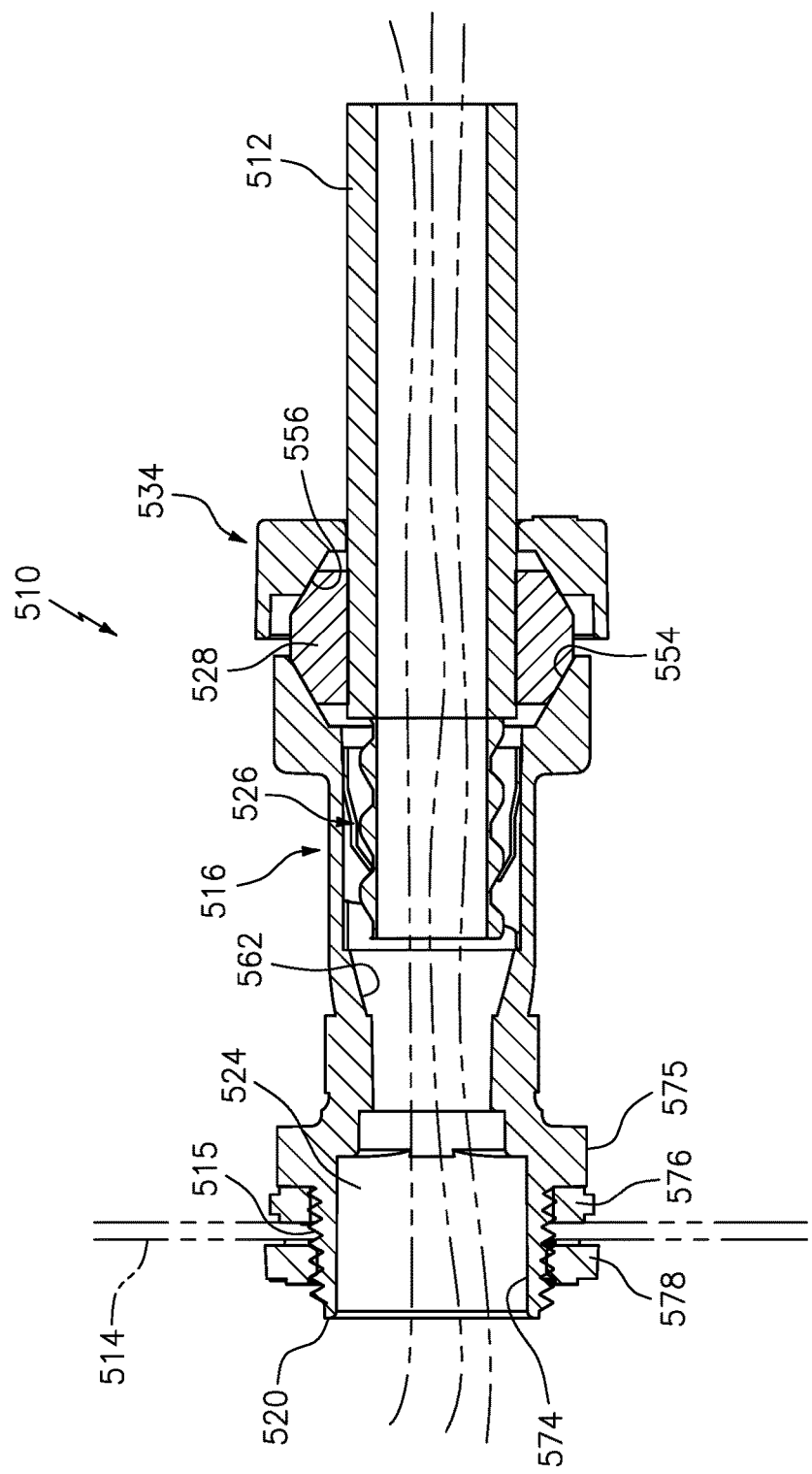
FIG. 17 is a cross-sectional view of the fitting of FIG. 16 assembled between two cables and a rigid conduit, and taken along the axis of one of the cables and along the axis of the rigid conduit.

In FIGS. 16-17, another embodiment of a fitting is indicated generally by the reference numeral 510. The fitting 510 is substantially the same as the fitting 10 described above in connection with FIGS. 1-7, and therefore like reference numerals preceded by the numeral "5" are used to identify the same or like elements. The primary difference of the fitting 510 in comparison to the fitting 10 is the construction of the connector 530. As shown in FIG. 17, the connector 530 is configured to connect the fitting to a box or enclosure 514, such as an electrical wall box, as opposed to a rigid conduit as described in connection with the embodiments above. The connector 530 comprises a male threaded boss 574, a nut 575 formed at the base of the boss, a sealing ring 576, and a locknut 578. As shown in FIG. 17, the sealing ring 576 is slipped over the threaded boss 574 and seated against the nut 575. Then, the threaded boss 574 is inserted through an aperture 515 extending through the wall of the enclosure 514. The locknut 578 is threadedly attached to the portion of the threaded boss 574 extending through the enclosure wall, and is threaded against the interior surface of the wall to compress the sealing ring 576 between the nut 575 and exterior surface of the wall. The compressed sealing ring 576 forms an annular raintight seal which, in turn, forms a raintight seal between (i) the enclosure 514 and fitting body 516 and (ii) between the second cable passageway 524 and ambient atmosphere. In the illustrated embodiment, the fitting body/threaded boss/nut is formed of zinc alloy, the nut 575 is a hex nut, the sealing ring 576 includes a polymeric sealing ring 577 extending about a metallic retainer ring 579, and the lock nut is formed of a zinc alloy. Also in the illustrated embodiment, the polymeric sealing ring is made of polyethylene, and the metal retainer ring is made of steel. However, as may be recognized by those of ordinary skill in the pertinent art based on the teachings herein, these materials of construction, and the configurations of the boss/nut, sealing/retainer ring, and locknut, may take the form of any of numerous different materials and/or configurations that are currently known, or that later become known.

As is known to those of ordinary skill in the pertinent art, a "raintight" fitting or seal is constructed so that exposure to a beating rain will not result in the entrance of water under specified test conditions. A "liquid-tight" fitting or seal, on the other hand, is constructed to pass not only the specified test conditions for raintight fittings or seals, but also to pass more challenging specified test conditions for preventing the entrance of water. Thus, a liquid-tight fitting also is a raintight fitting, and a liquid-tight seal also is a raintight seal; whereas a particular raintight fitting or raintight seal may not be liquid-tight. Thus, (i) any claim limitation herein directed to a "raintight" fitting is intended to literally read on a raintight fitting, a liquid-tight fitting and any other fitting that meets the specified test conditions for a raintight fitting; (ii) any claim limitation herein directed to a "raintight" seal is intended to literally read on a raintight seal, a liquid tight seal, or any other seal that meets the specified test conditions for a raintight seal; and (iii) any claim limitation herein directed to "raintight" is intended to literally read on "liquid-tight" or any corresponding structure that meets the specified test conditions for raintight. In addition, although fittings and seals are described herein as "raintight," they may be constructed to be "liquid-tight" in a manner known to those or ordinary skill in the pertinent art, if so desired.

As may be recognized by those of ordinary skill in the pertinent art based on the teachings herein, numerous changes and modifications may be made to the above-described and other embodiments of the present invention without departing from the scope of the invention as defined, for example, in the appended claims. For example, the fitting may further comprise a relatively rigid plate, such as a nylon or other polymeric plate, defining a plurality of cable apertures therethrough, that is mounted between the cable lock (s) and the seal with each cable aperture of the plate approximately aligned with a respective cable passageway of the seal. In addition, the fitting body, cover, cable locks, cable lock supports and seals or grommets may take any of numerous different configurations that are currently known, or that later become known. For example, a single seal or grommet may define plural cable passageways, or one fitting may include plural seals or grommets, where each seal or grommet defines one or more respective cable passageways. In addition, the seals or grommets may define any of numerous different sealing surfaces, such as angled or beveled sealing surfaces, radiused or curved sealing surfaces, flat sealing surfaces, or any combination of such sealing surfaces. The cover and fitting body likewise may define any of numerous different sealing surfaces for engaging the seal(s) or grommet(s) and forming a raintight or liquid-tight seal therebetween and between the seal(s) or grommet(s) and cable(s), and may define any of numerous different surface configurations for otherwise compressing the seal(s) or grommet(s) into contact with cable(s) to thereby form a raintight or liquid-tight seal therebetween. Similarly, the raintight or liquid-tight fittings at the second end of the fitting body may take any of numerous different configurations that are currently known, or that later become known. In addition, the cable locks and cable lock supports may be formed integral with each other as a single unit, or the cable lock support may be formed integral with the fitting body as a single unit. Still further, the fitting body, and thus the seals or grommets, may define any desired number of cable passageways to accept any desired number of cables. Accordingly, this detailed description of embodiments is to be taken in an illustrative as opposed to a limiting sense.

What is claimed is:

1. A sealed raintight transition fitting for plural electrical cables, wherein each electrical cable includes a flexible metallic covering, one or more insulated conductors located within the flexible metallic covering, and a raintight covering overlying the flexible metallic covering, the fitting comprising:
    a fitting body defining a first end and a second end, wherein the first end includes a plurality of first cable passageways, each first cable passageway is configured to receive a respective electrical cable, the second end includes a second cable passageway, the plurality of first cable passageways converge into the second cable passageway, and the second cable passageway is configured to receive the conductors from plural cables received in the first cable passageways;
    a plurality of cable locks, wherein each cable lock is located at a respective first cable passageway, is engageable with a cable received within the respective first cable passageway, and is configured to (i) secure the cable within the respective first cable passageway, and (ii) provide an electrically conductive path between the metallic covering of a cable received within the respective first cable passageway and the fitting body;
    a raintight seal located at the first end of the fitting body, extending about the periphery of each first cable passageway, and configured to form a raintight seal between the fitting body and the electrical cables received within the first cable passageways and between the first cable passageways and ambient atmosphere, wherein the raintight seal is elastic, defines a plurality of cable apertures, is mountable to the fitting body with each aperture located at a respective first cable passageway, and is deformable by compression from (i) a first shape wherein each aperture defines a first width or diameter that allows a respective cable to pass through the aperture and into the respective first cable passageway, to (ii) a second shape wherein each aperture defines a second width or diameter that is less than the first width or diameter and the seal is annularly engageable with the covering of a cable received in the respective first cable passageway to form a raintight annular seal between the respective cable and seal, the seal includes a peripheral portion extending along a periphery of the plurality of cable apertures, and an intermediary portion extending between adjacent cable apertures, wherein the peripheral portion defines a side surface including an angled surface portion located on a respective side of the side surface, and the side surface further includes a substantially flat surface portion located on one side of the angled surface portion; and
    a raintight connector located at the second end of the fitting body that is connectable to a conduit for receiving conductors in the second cable passageway, and is configured to form a raintight seal between the conduit and second end of the fitting body and between the second cable passageway and ambient atmosphere.

2. A fitting as defined in claim 1, further comprising a cover connectable to the fitting body, wherein the seal is mountable between the cover and fitting body, the cover is movable between first and second positions, in the first position the seal is in the first shape, and in the second position, the seal is deformed by the cover into the second shape.

3. A fitting as defined in claim 2, further comprising at least one fastener connected between the cover and fitting body, wherein the fastener secures the cover to the fitting body in the second position.

4. A fitting as defined in claim 3, wherein the at least one fastener is movable to thereby move the cover between the first and second positions.

5. A fitting as defined in claim 2, wherein the cover defines a second angled sealing surface that is engageable with the angled surface of the seal to form a raintight seal therebetween, and that directs the seal to deform inwardly toward the axis of each respective cable aperture when compressed against the second angled sealing surface.

6. A fitting as defined in claim 5, wherein the second angled sealing surface extends about a periphery of the cover.

7. A fitting as defined in claim 5, wherein the second angled sealing surface is defined by a first acute angle, and the angled surface of the seal is defined by a second acute angle that is approximately equal to the first acute angle.

8. A fitting as defined in claim 2, wherein the cover further defines on an interior surface thereof a protruding portion that engages a portion of the seal located between adjacent cable apertures and deforms the engaged portion of the seal inwardly toward an axis of each respective cable aperture.

9. A fitting as defined in claim 8, wherein the protruding portion is defined by an elongated rib formed on the interior surface of the cover.

10. A fitting as defined in claim 9, wherein the elongated rib defines an approximately triangular cross-sectional shape.

11. A fitting as defined in claim 2, wherein the cover includes a plurality of cable apertures formed therethrough and an intermediary portion extending between adjacent cable apertures, and each cable aperture of the cover is aligned with a respective cable aperture of the seal to allow a respective cable to pass through the cover aperture and seal aperture.

12. A fitting as defined in claim 11, wherein the peripheral portion and the intermediary portion form a raintight seal between the cover and fitting body.

13. A fitting as defined in claim 11, wherein the cover defines an elongated axis and an axially-elongated shape, the cover apertures extend along and are approximately symmetrical about the elongated cover axis, the seal defines an elongated axis and an axially-elongated shape, and the seal apertures extend along and are approximately symmetrical about the elongated seal axis.

14. A fitting as defined in claim 1, wherein the side surface includes a first angled surface portion located on one side of the side surface, and a second angled surface portion located on an opposite side of the side surface.

15. A fitting as defined in claim 14, wherein each cable aperture defines an axis extending therethrough, the first angled surface portion is oriented at a first acute angle with respect to a cable aperture axis, and the second angled surface portion is oriented at a second acute angle with respect to a cable aperture axis.

16. A fitting as defined in claim 15, wherein the substantially flat surface portion extends between the first and second angled surface portions.

17. A fitting as defined in claim 1, wherein the angled surface portion is angled inwardly toward a cable aperture axis.

18. A fitting as defined in claim 17, wherein the side surface includes first and second angled surface portions angled in approximately opposite directions relative to each other.

19. A fitting as defined in claim 1, wherein the side surface extends about the periphery of the seal.

20. A fitting as defined in claim 19, wherein the angled surface portion and the substantially flat surface portion extend about the periphery of the seal.

21. A fitting as defined in claim 20, wherein the seal defines a plurality of adjacent, aligned cable apertures.

22. A fitting as defined in claim 21, wherein the angled surface portion extends about a periphery of a plurality of adjacent, aligned cable apertures.

23. A fitting as defined in claim 22, wherein the angled surface portion extends about a portion of the periphery of each cable aperture, and extends along an intermediary portion of the seal extending between adjacent cable apertures.

24. A fitting as defined in claim 23, wherein the angled surface portion extends along a portion of the periphery of each cable aperture that is within the range of greater than about ½ of each periphery to less than about ⅘ of each periphery.

25. A fitting as defined in claim 1, wherein the seal defines an upper surface and a lower surface, and the side surface extends between the upper and lower surfaces.

26. A fitting as defined in claim 25, wherein the upper and lower surfaces are substantially flat.

27. A fitting as defined in claim 1, wherein the seal includes a single sealing member defining the peripheral portion, the intermediary portion and the plurality of cable apertures.

28. A fitting as defined in claim 1, wherein the seal includes a first sealing member defining one or more first cable apertures and a second sealing member defining one or more second cable apertures, and the intermediary portion is defined by an interface between the first and second sealing members.

29. A fitting as defined in claim 28, wherein the interface is defined by opposing substantially flat side surface portions of the first and second sealing members.

30. A fitting as defined in claim 1, wherein the fitting body defines a first angled sealing surface that is engageable with the angled surface of the seal to form a seal therebetween, and that directs the seal to deform inwardly toward the axis of each respective cable aperture when compressed against the first angled sealing surface.

31. A fitting as defined in claim 30, wherein the first angled sealing surface extends about a periphery of the first end of the fitting body.

32. A fitting as defined in claim 30, wherein the first angled sealing surface is defined by a first acute angle, and the angled surface of the seal is defined by a second acute angle that is approximately equal to the first acute angle.

33. A fitting as defined in claim 1, further comprising a relatively rigid plate defining a plurality of cable apertures therethrough, wherein the plate is mountable between the cable locks and the seal with each cable aperture of the plate approximately aligned with a respective cable passageway of the seal.

34. A sealed raintight transition fitting for plural electrical cables, wherein each electrical cable includes a flexible metallic covering, one or more insulated conductors located within the flexible metallic covering, and a raintight covering overlying the flexible metallic covering, the fitting comprising:

a fitting body defining a first end and a second end, wherein the first end includes a plurality of first cable passageways, each first cable passageway is configured to receive a respective electrical cable, the second end includes a second cable passageway, the plurality of first cable passageways converge into the second cable passageway, and the second cable passageway is configured to receive the conductors from plural cables received in the first cable passageways;

a raintight seal located at the first end of the fitting body, extending about the periphery of each first cable passageway, and configured to form a raintight seal between the fitting body and the electrical cables received within the first cable passageways and between the first cable passageways and ambient atmosphere;

a raintight connector located at the second end of the fitting body that is connectable to a conduit for receiving conductors in the second cable passageway, and is configured to form a raintight seal between the conduit and second end of the fitting body and between the second cable passageway and ambient atmosphere;

a first cable lock, a second cable lock, and a cable lock support located between the first and second cable locks, wherein each cable lock is located at a respective first cable passageway, is engageable with a cable received within the respective first cable passageway, is configured to secure the cable within the respective first cable passageway, defines an axis, and includes a locking tab that depends inwardly toward the axis, wherein each locking tab is engageable with the metallic covering of a cable received within the respective first cable passageway and defines an electrically conductive path between the metallic covering and the fitting body, and the fitting body includes an interior surface defining a hollow interior, and each cable lock is received within the hollow interior and is frictionally engaged with the interior surface of the fitting body.

35. A fitting as defined in claim 34, wherein the cable lock support frictionally engages the first and second cable locks.

36. A fitting as defined in claim 34, wherein each cable lock includes a body defining a curved body portion and a substantially flat body portion, the curved body portion frictionally engages the interior surface of the fitting body and the substantially flat body portion frictionally engages the cable lock support.

37. A fitting as defined in claim 36, wherein the fitting body defines an at least one elongated recess that frictionally receives therein a respective side of the cable lock support.

38. A fitting as defined in claim 37, wherein the fitting body defines a first elongated recess formed on one side of the hollow interior and a second elongated recess formed on a substantially opposite side of the hollow interior, and opposite sides of the cable lock support are frictionally received and retained within the respective elongated recesses.

39. A fitting as defined in claim 37, wherein the elongated recess is defined by a pair of spaced ribs defining the recess therebetween.

40. A fitting as defined in claim 34, wherein the cable lock support defines a protruding portion that engages the seal and deforms the engaged portion of the seal inwardly toward an axis of each respective cable aperture.

41. A fitting as defined in claim 34, further comprising a plurality of electrical cables, wherein each electrical cable includes a flexible metallic covering, one or more insulated conductors located within the flexible metallic covering, and a raintight or liquid-tight covering overlying the flexible metallic covering, each electrical cable is received within a respective first cable passageway, the raintight seal extends about the periphery of each first cable passageway, and forms a raintight seal between the fitting body and the electrical cables received within the first cable passageways and between the first cable passageways and ambient atmosphere.

42. A fitting as defined in claim 41, further comprising a conduit connected to the raintight connector and receiving the conductors in the second cable passageway, and wherein the raintight connector forms a raintight seal between the conduit and second end of the fitting body and between the second cable passageway and ambient atmosphere.

43. A fitting as defined in claim 34, wherein the cable lock support and a plurality of cable locks are formed integral with each other.

44. A fitting as defined in claim 34, wherein the cable lock support and a plurality of cable locks are formed in one piece.

45. A fitting as defined in claim 34, wherein the cable lock support is formed integral with the fitting body.

46. A fitting as defined in claim 34, further comprising a plurality of cable lock supports between respective adjacent cable locks.

47. A sealed raintight transition fitting for plural electrical cables, wherein each electrical cable includes a flexible metallic covering, one or more insulated conductors located within the flexible metallic covering, and a raintight covering overlying the flexible metallic covering, the fitting comprising:
a fitting body defining a first end and a second end, wherein the first end includes a plurality of first cable passageways, each first cable passageway is configured to receive a respective electrical cable, the second end includes a second cable passageway, the plurality of first cable passageways converge into the second cable passageway, and the second cable passageway is configured to receive the conductors from plural cables received in the first cable passageways;
a raintight seal located at the first end of the fitting body, extending about the periphery of each first cable passageway, and configured to form a raintight seal between the fitting body and the electrical cables received within the first cable passageways and between the first cable passageways and ambient atmosphere;
a raintight connector located at the second end of the fitting body that is connectable to a conduit for receiving conductors in the second cable passageway, and is configured to form a raintight seal between the conduit and second end of the fitting body and between the second cable passageway and ambient atmosphere; and
a plurality of cable locks, wherein each cable lock is located at a respective first cable passageway, is engageable with a cable received within the respective first cable passageway, and is configured to (i) secure the cable within the respective first cable passageway, (ii) provide an electrically conductive path between the metallic covering of a cable received within the respective first cable passageway and the fitting body, and (iii) prevent a cable received in the respective first cable passageway from being pulled from the respective first cable passageway, but allow the cable to be rotatably removed from the respective first cable passageway.

48. A raintight fitting for plural electrical cables, wherein each cable includes a flexible metallic covering, one or more insulated conductors located within the flexible metallic covering, and a raintight covering overlying the flexible metallic covering, the fitting comprising:
first means for providing on a first side thereof a plurality of first cable passageways, for receiving an electrical cable in each first cable passageway, for converging the plurality of first cable passageways into a second cable passageway located at a second side thereof, and for receiving the conductors from the plural cables in the first cable passageways into and through the second cable passageway, wherein the first means includes an interior surface defining a hollow interior;
a plurality of adjacent second means each for securing a respective cable within the respective first cable passageway, and for providing an electrically conductive path between the metallic covering of the cable received within the respective first cable passageway and the first means, wherein each second means is received within the hollow interior of the first means and is fixedly retained with the interior surface of the first means;
third means for covering the first means at the first side thereof and for receiving therethrough the cables passing through the first cable passageways in the first means;
fourth means located at the first end of the first means and extending about the periphery of each first cable passageway for forming a raintight seal between the first means and the electrical cables received within the first cable passageways and between the first cable passageways and ambient atmosphere;
fifth means located at the second end of the first means for connecting to a conduit for receiving conductors in the second cable passageway, and for forming a raintight seal between the conduit and second end of the first means and between the second cable passageway and ambient atmosphere; and
sixth means located between adjacent second means for supporting the second means, wherein each second means defines an axis and includes seventh means depending inwardly toward the axis for engaging the metallic covering of a cable received with the respective first cable passageway and defining an electrically conductive path between the metallic covering of the cable and the first means.

49. A fitting as defined in claim 48, wherein the fourth means defines a plurality of cable apertures therethrough and each cable aperture is located at a respective first cable passageway, and further is for deforming from (i) a first shape wherein each aperture defines a first width or diameter that allows a respective cable to pass through the aperture and into the respective first cable passageway, to (ii) a second shape wherein each aperture defines a second width or diameter that is less than the first width or diameter and the fourth means further is for annularly engaging a cable received in the respective first cable passageway and forming a raintight annular seal between the respective cable and the third and fourth means.

50. A fitting as defined in claim 49, wherein the first means is a fitting body, each second means is a cable lock, the third means is a cover, the fourth means is an elastic seal, the fifth means is a raintight connector, the sixth means is a cable lock support, and the seventh means is a tab.

51. A sealed raintight transition fitting for plural electrical cables, wherein each electrical cable includes a flexible metallic covering, one or more insulated conductors located within the flexible metallic covering, and a raintight covering overlying the flexible metallic covering, the fitting comprising:
a fitting body defining a first end and a second end, wherein the first end includes a plurality of first cable passageways, each first cable passageway is configured to receive a respective electrical cable, the second end includes a second cable passageway, the plurality of first cable passageways converge into the second cable passageway, and the second cable passageway is configured to receive the conductors from plural cables received in the first cable passageways;
a raintight seal located at the first end of the fitting body, extending about the periphery of each first cable passageway, and configured to form a raintight seal between the fitting body and the electrical cables received within the first cable passageways and between the first cable passageways and ambient atmosphere;
a raintight connector located at the second end of the fitting body that is connectable to a conduit for receiving conductors in the second cable passageway, and is configured to form a raintight seal between the conduit and second end of the fitting body and between the second cable passageway and ambient atmosphere;
a first cable lock, a second cable lock, and a cable lock support located between the first and second cable locks, wherein each cable lock is located at a respective first cable passageway, is engageable with a cable received within the respective first cable passageway, is configured to secure the cable within the respective first cable passageway, defines an axis, and includes a cable locking member engageable with the metallic covering of a cable received within the respective first cable passageway and defining an electrically conductive path between the metallic covering and the fitting body, wherein the fitting body includes an interior surface defining a hollow interior, and each cable lock is received within the hollow interior and fixedly retained with the interior surface of the fitting body.

52. A fitting as defined in claim 51, wherein the cable lock support and a plurality of cable locks are formed integral with each other.

53. A fitting as defined in claim 51, wherein the cable lock support and a plurality of cable locks are formed in one piece.

54. A fitting as defined in claim 51, wherein the cable lock support is formed integral with the fitting body.

55. A fitting as defined in claim 51, further comprising a plurality of cable lock supports between respective adjacent cable locks.

56. A fitting as defined in claim 51, wherein each cable lock is configured to prevent a cable received in the respective first cable passageway from being pulled from the respective first cable passageway, and to allow the cable to be rotatably removed from the respective first cable passageway.

* * * * *